(12) United States Patent
Maehner et al.

(10) Patent No.: US 7,755,746 B2
(45) Date of Patent: Jul. 13, 2010

(54) DEVICE FOR TESTING A TEST OBJECT, IN PARTICULAR A TIRE, BY MEANS OF A NON-DESTRUCTIVE MEASURING METHOD

(76) Inventors: Bernward Maehner, Landsberger Str. 51, 82205, Gilching (DE); Stefan Dengler, Mauswiesenweg 10, 75365, Calw-Stammheim (DE)

( * ) Notice: Subject to any disclaimer, the term of this patent is extended or adjusted under 35 U.S.C. 154(b) by 180 days.

(21) Appl. No.: 11/963,260

(22) Filed: Dec. 21, 2007

(65) Prior Publication Data
US 2008/0158569 A1    Jul. 3, 2008

(30) Foreign Application Priority Data
Dec. 22, 2006    (DE)    ........................ 10 2006 061 003

(51) Int. Cl.
*G01L 1/24* (2006.01)
(52) U.S. Cl. ..................................... 356/35.5
(58) Field of Classification Search ............... 356/35.5, 356/450, 520; 73/146
See application file for complete search history.

(56) References Cited

U.S. PATENT DOCUMENTS

| | | | | |
|---|---|---|---|---|
| 4,682,892 A | * | 7/1987 | Chawla | ........................ 356/458 |
| 5,703,680 A | * | 12/1997 | Dunn et al. | ................. 356/35.5 |
| 6,791,695 B2 | * | 9/2004 | Lindsay et al. | ............... 356/520 |
| 6,934,018 B2 | * | 8/2005 | Shaw et al. | ............... 356/237.2 |
| 7,187,437 B2 | * | 3/2007 | Shaw et al. | ............... 356/237.2 |

FOREIGN PATENT DOCUMENTS

| | | |
|---|---|---|
| DE | 261508 A1 | 4/1976 |
| DE | 3225419 A1 | 1/1984 |
| DE | 4231578 A1 | 3/1994 |
| DE | 20006840 U1 | 4/2000 |
| DE | 19944314 A1 | 4/2001 |
| DE | 10333802 A1 | 2/2005 |
| EP | 1014036 B1 | 6/2000 |
| EP | 1284409 A1 | 2/2003 |

* cited by examiner

*Primary Examiner*—Michael A Lyons
(74) *Attorney, Agent, or Firm*—Stephen B. Salai, Esq.; Brian B. Shaw, Esq.; Harter Secrest & Emery LLP

(57) ABSTRACT

A non-destructive tire testing device has at least one measuring head, a positioning means for moving the measuring head between a park position (I) and a measuring position (II), a pressure chamber in which the test object can be subjected to a prescribed pressure, and a sub-frame on which the test object can be mounted during the test. The sub-frame is supported on a first vibration reducing bearing element. The pressure chamber has a hood which is supported separately from the sub-frame on a second vibration reducing bearing.

43 Claims, 4 Drawing Sheets

Figure 1:
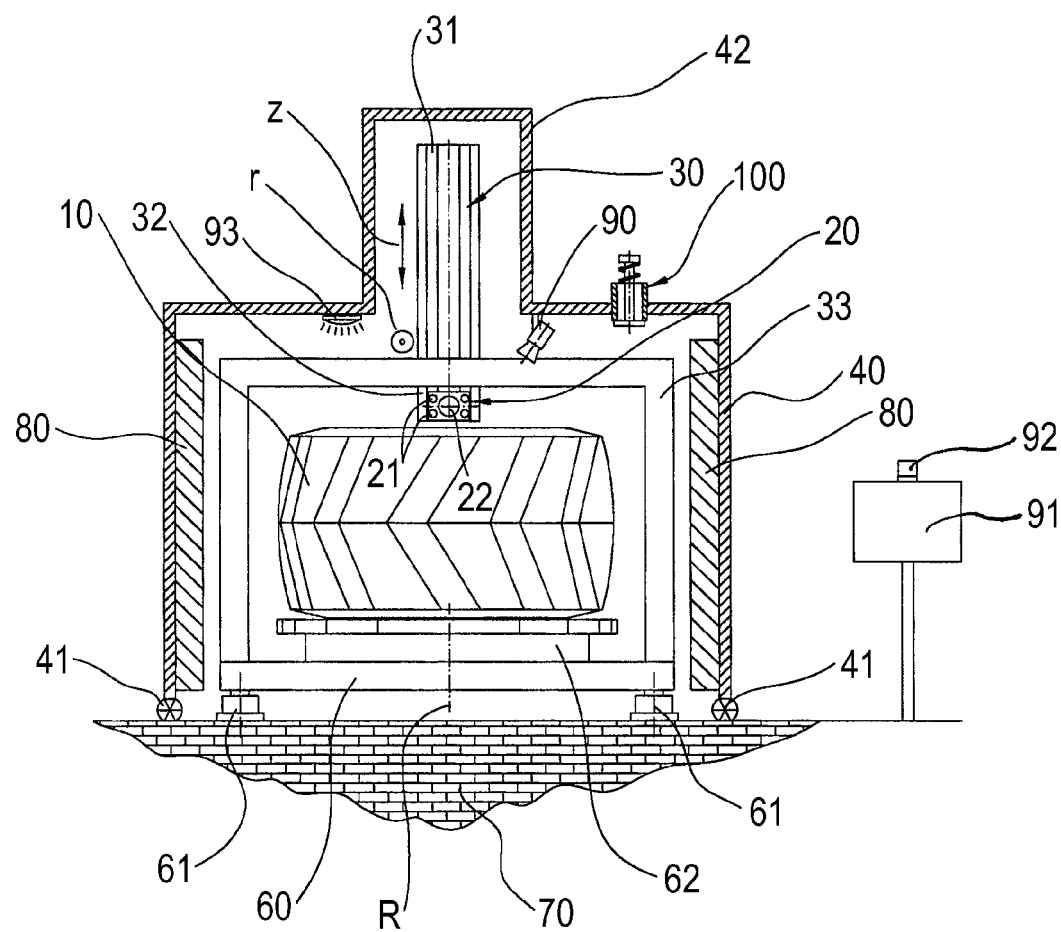

DEVICE FOR TESTING A TEST OBJECT, IN PARTICULAR A TIRE, BY MEANS OF A NON-DESTRUCTIVE MEASURING METHOD

BACKGROUND OF THE INVENTION

1. Technical Field

The invention concerns a device for testing a test object by means of a non-destructive measuring method. The test object is in particular a tire, however other components could also be tested using the device that is the subject-matter of the invention. The non-destructive measuring method with which the test object is tested is, for example, an interferometric measuring method. The device has at least one measuring head by means of which the test object is scanned to produce a measurement result. The device also has a positioning means by which the measuring head can be moved between a park position outside the test object and a measuring position located, for example, within the test object. In addition, the device is provided with a pressure chamber in which, during the test, the test object can be subjected to a prescribed pressure; the chamber has a hood. The device is also provided with a sub-frame on which the test object can be mounted during the test.

2. Description of Related Art

Tires or other component parts which are under load when in use are subjected to material tests to check their quality in order to reduce the safety risks; these tests enable faulty areas, known as defects, to be recognised. Above all, when used tires are to be remoulded, as a rule a non-destructive material test is employed which guarantees a comparatively fast series examination.

Optical measuring methods are frequently to be found in industrial practice such as for example holography or shearography, also commonly known as speckle pattern shearing interferometry. Shearography is a relative interferometric measuring method that produces a result image which shows the difference between two chronologically staggered conditions of the test object. In order to generate the resulting digital image used as a rule nowadays in view of the increasing application of electronic image sensors such as CCD- or CMOS-sensors, it is thus necessary to change the condition of the test object between two measurements by mechanical, thermal or pneumatic forces. To this end, known devices are provided with a pressure chamber which is either evacuated or pressurized so that the test object inside the chamber is deformed as a result of the pressure change and thus transfers from a first reference state to a second measurable state.

In contrast to holography, shearography does not determine the deformation on the surface of a test object but rather measures the gradients of deformation. This is attributable to the fact that shearography makes use of what is known as a shearing element which makes use of shear optics such as for example an optical wedge, an optical biprism or a Michelson interferometer, which generates image duplication. As a result of the shearing element, two slightly spatially-shifted images of the test object are produced and superimposed so as to generate an interferogram from the interference obtained. The shearogram characterised by the gradients of the deformation is created by subtraction of the intensities of the interferograms obtained in the reference state and the measured state. The shearogram indicates whether the position of a point in relation to a neighboring point has changed as a result of the deformation of the test object. If it has, then this positional difference leads to a local change in the intensity distribution which gives information about defects. Interferometric measuring methods which are based on this speckle-interferometry are described in DE 42 31 578 A1 and EP 1 014 036 B1.

The devices employed to test a test object by means of an interferometric measuring method generally have at least one measuring head which is provided with an illumination unit and an image-acquisition unit. The illuminating unit frequently consists of a coherent-light-emitting laser or laser diode. The image acquisition unit is usually a camera provided with an image sensor, i.e. a light-sensitive semiconductor sensor, for example a CCD- or CMOS-sensor. To achieve meaningful measurement results it is necessary to co-ordinate the camera's field of vision and the section of the test object that is to be tested. Generally, such co-ordination is achieved by positioning the measuring head in a measuring position and orienting it in an observation direction which ensure, on the one hand, that the section of the test object to be tested lies completely within the field of vision of the camera and, on the other hand, that sections to be tested and measured in sequence overlap each other sufficiently to enable a complete and thorough test. The measuring position and the observation direction of the measuring head depend on the dimensions of the test object. Accordingly, devices are known from EP 1 284 409 A1 and DE 103 33 802 A1 which enable the test object to be measured optically, for example by means of what are called light sections, so that the measuring head can be positioned and oriented depending on the data acquired in this way.

A tire testing device in which a tire to be tested without a wheel or rim is placed in a pressure chamber in a lying position is disclosed in DE 1 99 44 314 A1. The tire-testing device is provided with several measuring heads which can be positioned at a prescribed distance from the inner peripheral surface, the inner sidewall or the outer sidewall of the tire in order to test the substructure of the tire, i.e. the carcass, a belt frequently incorporated between the carcass and the running surface as well as the sidewall of the tire. The measuring heads each have an illuminating unit and an image acquisition unit and are positioned at an angle to each other so that different sections of the tire can be tested at the same time in order to perform the test comparatively quickly.

The measuring heads are connected to a positioning means which makes it possible to move the measuring heads from a park position outside the tire, which enables the tire to be tested to be changed, into a measuring position inside the tire to enable the inner peripheral surface and the inner sidewall of the tire to be tested. For this purpose the positioning means is provided with an arm that is movable around the longitudinal axis of the tire and on which the measuring heads are mounted. To enable the measuring heads to be brought into the necessary measuring position and into the desired observation direction, the measuring heads are movable in the radial direction of the tire and they can be swivelled around a pivot axle mounted on the arm.

The pressure chamber is formed with a hood which is arranged on a vertically movable slide. When the pressure chamber is in the closed position, the hood lies in a sealed position on the sub-frame on which the tire to be tested lies during the test. The hood is made in one piece and is, for example, of moulded material. Since the hood has to surround the tire to be tested, and in view of the comparatively large diameter of some tires to be tested, the dimensions of the hood would be such that it would have a significant weight. In this case, the hood would no longer be able to be handled without considerable trouble. The known testing device is thus, in practical terms, unsuitable for the testing of tires with a comparatively large diameter.

Tires with a comparatively large diameter are used mostly on heavy machinery. Heavy machinery such as industrial and agricultural vehicles or earth-moving machines are, as a rule, equipped with what are known as Off-The-Road (OTR) tires which have a comparatively large diameter of sometimes more than 5 meters. OTR tires have a high load-bearing capacity. For example, OTR tires can carry dumper trucks which are used for transport in mining activities or for freight transport at cargo ports and which can have loading capacities of more than 70 tons.

The use of OTR tires is associated with considerable risks. For example, the pressure wave generated by a burst of an OTR tire can cause considerable damage and can seriously endanger the safety of any person in the vicinity of the vehicle with the OTR tire in question. Moreover, the immobility of a vehicle fitted with OTR tires following tire damage is generally linked to very severe economic losses. It is frequently the case that mines and quarries, for example, have only single-track access roads and, consequently, if a vehicle used for carrying away the mined or quarried materials, mineral ore for example, breaks down, this can cause the whole mine or quarry to be temporarily brought to a standstill. The testing of OTR tires for flaws and defects is thus enormously important.

SUMMARY OF THE INVENTION

The object of the invention is to create a device for the testing of a test object by means of which it is possible to test relatively large component parts, in particular tires, with a comparatively large diameter.

The device according to the invention for the testing of a test object is provided with at least one measuring head by means of which the object to be tested is scanned to produce a measurement result. The measuring head or the measuring heads are designed as, for example, those described in EP 1 014 036 B1, in order to test the test object by means of an interferometric measuring method. In principle it is also possible for the measuring head to be configured in such a way that enables it to perform in other non-destructive testing methods such as ultrasound testing, or radiographic testing using x-rays. Furthermore, it is possible that several measuring heads are provided by means of which different measuring methods can be carried out, for example one or more measuring heads for performing interferometric measuring methods and one or more measuring heads for performing radiographic testing using x-rays. The device according to the invention is also provided with a positioning means by which the measuring head can be moved between a park position outside the test object and a measuring position located, for example, within the test object. In addition, the device is provided with a pressure chamber in which, during the test, the test object can be subjected to a prescribed pressure; the chamber has a hood. The device is also provided with a sub-frame on which the test object can be mounted during the test.

The sub-frame is supported on a first bearing element through which the transmission of vibrations from a base to a sub-frame can be reduced. The hood is supported on a second bearing element by means of which the transmission of vibrations from the base to the hood are reduced. The hood is supported separately from the sub-frame so that the first bearing element can be designed uniquely for supporting the sub-frame and the second bearing element can be designed uniquely for supporting the hood. This functional isolation is particularly useful when relatively large component parts, such as OTR tires, have to be tested and accordingly the hood is relatively large and heavy.

The hood has an open side which faces towards the base. Accordingly, the base also contributes to the sealing of the pressure chamber. In the simplest case, the base could be the ground, for example the floor of a building. Yet the base could also be a plate arranged on the ground or some other kind of surface which is suitable to achieve a pressure-tight sealing of the pressure chamber.

In a preferred embodiment of the invention the first bearing element and/or the second bearing element can be configured as vibration insulators designed to minimize the vibrations, particularly the airborne and structure-borne vibrations. In this case the spring stiffness of the bearing element carrying the weight to be supported and the frequency of the vibrations to be absorbed are so adjusted that the inherent frequency of the bearing element and the weight to be supported are far below the excitation frequency. This co-ordination of the bearing element can be achieved much more easily than was the case in the prior art because the supports for the hood and the base are separate from each other. This applies particularly when the test object is comparatively large, as for example an OTR tire, so that the hood surrounding the test object is also comparatively large and, accordingly, as a rule, is heavy. Known rubber and metal components, such as rubber springs, can be used to make the vibration-absorbing bearing elements. It is also possible, however, to make the bearing elements with steel springs, air cushions and/or hydropneumatic springs. In addition, depending on the application in question, the bearing elements could be configured as vibration dampers or as oscillation reducers.

In a further preferred embodiment of the device according to the invention the second bearing element can alternatively or additionally configured to be used as a sealing element. The sealing element is, for example, an extruded seal or sealing strip which provides the pressure-tight closure of the hood against the base. It is also possible for the second bearing element to be made up of such a seal and, for example, a vibration insulator. In this way, for example, a hood that was square or rectangular in cross-section could be supported in each corner area by a vibration insulator and the space between the vibration insulators could be closed with a seal.

Particularly in cases in which the hood has relatively large dimensions, it is advantageous if the hood can be dismantled non-destructively. In this way the hood can be stripped down to its component parts to enable it to be transported easily. In this regard it is also advantageous if the sub-frame and/or the positioning means can also be dismantled non-destructively.

It is also advantageous to support the positioning means on the sub-frame so that no separate bearing elements are required for the positioning means. Yet it is possible to mount the positioning means separately from the sub-frame by providing a bearing element for it on the base.

Preferably the hood should be provided with an extension which accommodates at least part of the positioning means in the park position. Such a design enables the hood to be dimensioned primarily to suit the size of the test object and thus to be designed as compactly as possible thus making evacuation, or pressurization, of the pressure chamber a relatively fast operation as is required, for example, when a tire has to be tested by means of a shearographic measuring method. The extension, which mainly accommodates the positioning means, and in some cases the measuring head, has a relatively small volume so that the time needed to perform a pressure change in the pressure chamber is only marginally influenced by the volume of the extension. The location of the extension depends on the design of the positioning means. Accordingly, the extension could be, for example, in the top surface area and/or in a side face area of the hood.

Furthermore, it is an advantage when the hood is provided with a frame which is clad with a number of panels. These panels, which expediently should be made pressure-tight by means of a seal, enable the hood to be modelled to the measuring method to be used. If, for example, a radiographic test using x-rays is to be performed, the panels can be coated in lead, for example, to provide protection against x-rays. In order, on the one hand, to make the replacement of panels simple and, on the other hand, to make the hood easier to dismantle for transport reasons, the panels are preferably fastened to the frame by detachable means, e.g. screws. It is also an advantage with a view to transportation of the hood that the frame should be able to be dismantled non-destructively into a number of pieces. These frame parts can be connected to each other, for example, by means of screws.

It is favourable to provide the hood with a door which preferably has a single or double door. In contrast to the prior art described in DE 199 44 314 A1, it is not necessary, thanks to the door, to raise the hood in order to arrange the test object on the sub-frame. But rather the test object can be transported through the door into the pressure chamber. The provision of a door becomes important above all with comparatively large test objects, for example OTR tires, because in this case the hood is comparatively heavy so that the design of a slide for raising and lowering it would involve considerable expense. In the case of comparatively large test objects and a correspondingly large door opening, it would be appropriate to design a double or multiple-part door to enable the door to be opened and closed easily and, if the door is configured in a favourable way as a swing door, to achieve the smallest possible swinging range. The door, configured expediently as a swing door, is movable either about a vertical axis or about at least one horizontal axis. In the former case it has proved advantageous to support the door with a wheel to ensure the easy opening and closing of the door even when the door is comparatively large and heavy. In the latter case, it is advantageous to connect the door to a counterweight to facilitate easy opening and closing of the e.g. swing- and slide-mounted door. Depending of the application, the door can be designed as a sliding or sash door. It is expedient for the door in the closed state to be made pressure-tight by means of a seal so that pressure changes can be performed in the chamber as is necessary, for example, in a shearographic measuring method.

A preferred embodiment of the device according to the invention has at least one piece of padding in the pressure chamber. The padding, made for example of foam and enclosed in a gas-tight sheath, first of all has the purpose of dampening airborne and structure-borne vibration and also of reducing the volume of the pressure chamber so that the time required to achieve a pressure change in the chamber is shortened. The padding is preferably transportable so that the volume of the pressure chamber can be adjusted to suit the size of the test objects by the provision of an appropriate number of padding elements.

It is preferable to have at least one camera positioned in the pressure chamber which is for practical purposes connected by means of a radio link to a monitor located outside the pressure chamber. The camera and monitor can form part of a navigation system which facilitates the charging and evacuating of the pressure chamber, for example by means of a fork-lift truck. However, the camera can also be used to observe the interior of the pressure chamber while the test object is being tested. In order to ensure the necessary illumination of the interior of the pressure chamber to enable the camera in the pressure chamber to provide reliable pictures, it is an advantage to have at least one source of artificial light.

The provision of such a light source obviates the need to have a window, thus making the construction of the hood easier and more economical. Above all, when a test object is to be tested using a shearographic measuring method, the artificial light source represents an advantage over the incidental daylight coming into the chamber via the window since it is easier to adjust the intensity and wavelength of the rays emitted by the light source to suit the measuring head in such a way as to prevent any restriction of the shearographic test due to the light source.

Furthermore, in the interests of achieving a configuration of the device according to the invention that complies with safety requirements, it is advantageous to fit the pressure chamber with a safety valve. The safety valve prevents severe under-pressure or over-pressure within the pressure chamber. Above all, when comparatively large test objects have to be tested and, consequently, the pressure chamber has a large volume, it has been observed that a pressure deviation of approx. 150 mbar above or below the prescribed pressure can lead to permanent deformation of the hood.

It is preferable for the positioning means to render the measuring head movable in an axial direction and/or in a radial direction. Such a configuration is particularly appropriate when the test object has rotational symmetry, as is the case with a tire. It is often most practical to conduct tests when the test object is in a lying position. In such a situation the axial direction is vertical whereas the radial direction is horizontal. However, depending on the application, it can be practical to have the test object in an upright position in order to test it so that the axial direction is horizontal, as for example is known from DE 203 14 939 U1. This kind of arrangement is particularly appropriate if the test object, for example an OTR tire, is comparatively heavy and the turning-over of the test object is a comparatively complicated operation.

The positioning means preferably includes a first adjustment assembly, by means of which the measuring head can be moved in the axial direction, and a second adjustment assembly, by means of which the measuring head can be moved in a radial direction. The adjustment assemblies are configured, for example, as linear guides or as linear motors and can be coupled to each other. Depending on the application, the positioning means can also comprise further adjustment assemblies which can enable the measuring head to be swivelled around a horizontal or vertical axis.

If the test object is a body with rotational symmetry, such as a tire, it has proved advantageous for the measuring head to be rotatable around a rotation axis or a roll axis extending in the axial direction in relation to the test object. In this way the test object can be scanned completely around its periphery. In this context it is also advantageous for the sub-frame to be provided with a rotational installation enabling the test object to be turned around the rotational axis. Alternatively, or additionally, the relative movement of the test object and the measuring head can be achieved by a rotatable configuration of the positioning means.

To be able to implement interferometric measuring methods, the measuring head is preferably provided with an illuminating unit by means of which the test object is illuminated, a shearing element which uses the light beams reflected back from the test object for interference and an electronic image sensor which is arranged within the optical path of the shearing element and which records the interfering light beams. Depending on the individual application, the illuminating unit, composed for example of laser diodes, can be either an integral constituent of the measuring head or can be separate from it.

The device according to the invention preferably has a protective screen which serves to shield the measuring head, and in particular the illuminating unit, in the park position. Above all, when the illuminating unit is made up of one or more lasers or laser diodes whose frequency stability in general depends on the operating temperature, the protective screen offers the advantage that these laser light sources can be operated without interruption and thus to avoid the temperature fluctuations caused by the process of switching on and off. The laser beams emitted by the laser light sources are shielded by the protective screen so that people can enter the pressure chamber without danger, for example, to position the test object on the sub-frame.

With a view to attaining an appropriate configuration, it is also an advantage when the device according to the invention also comprises a control and evaluating installation by means of which the positioning means and/or the rotating installation and/or the measuring head and/or the pressure prevailing in the pressure chamber can be controlled and the measurement result can be evaluated.

BRIEF DESCRIPTION OF THE DRAWING FIGURES

Figure 2:
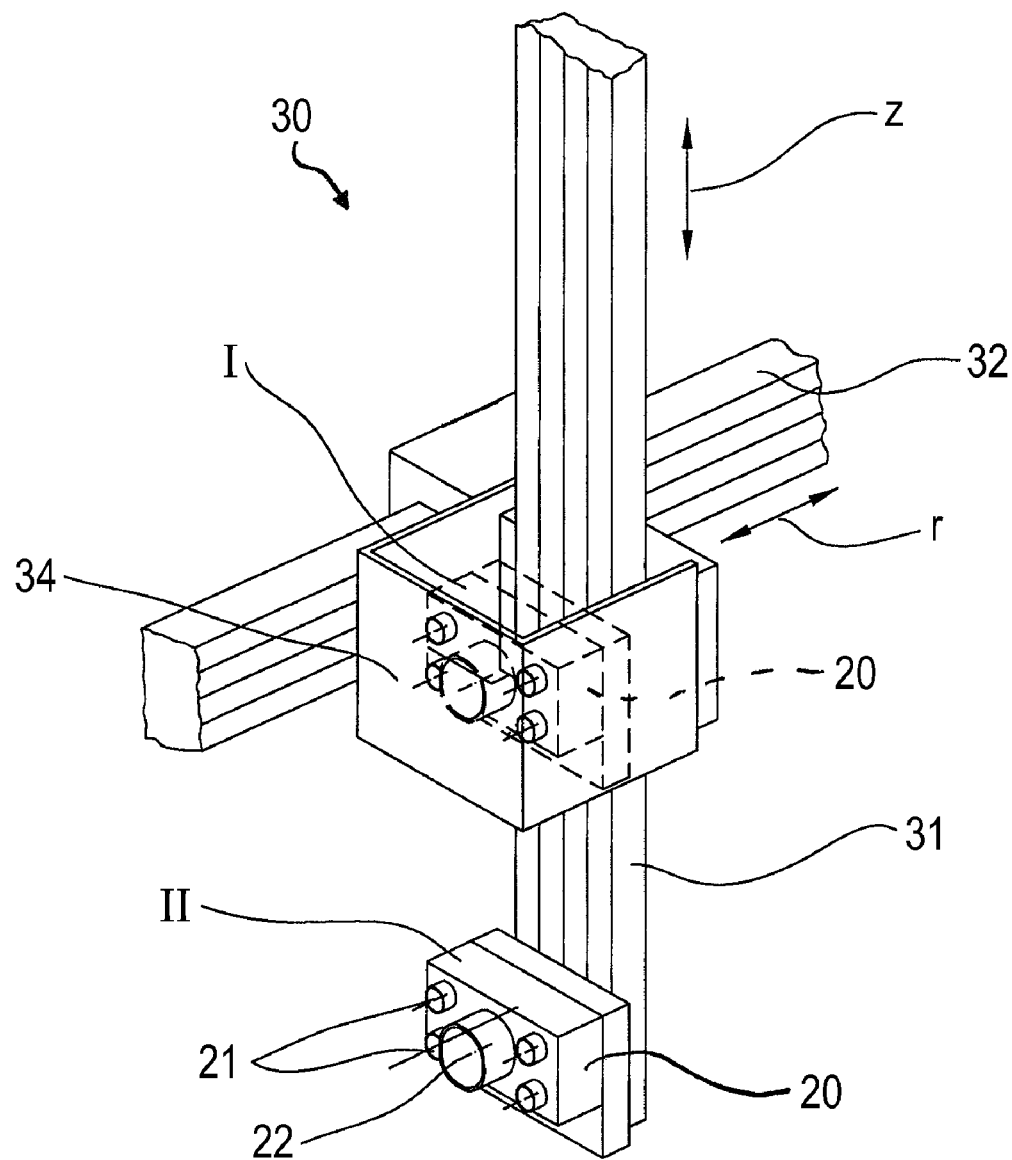
Figure 3:
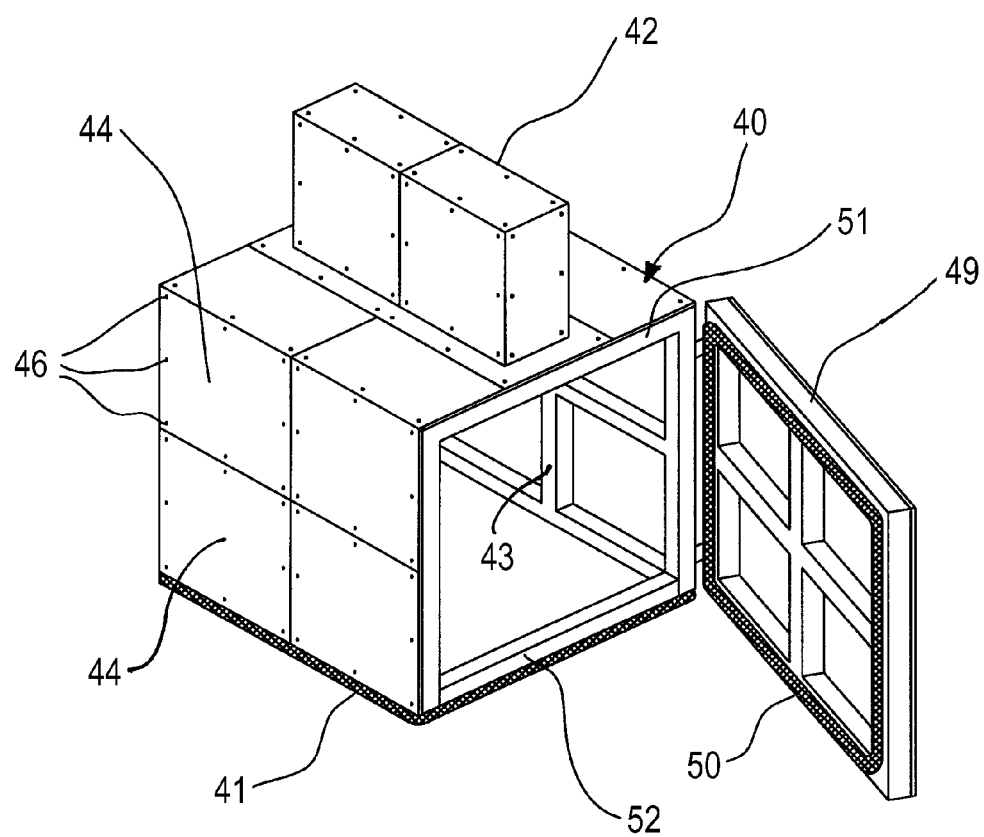
Figure 4:
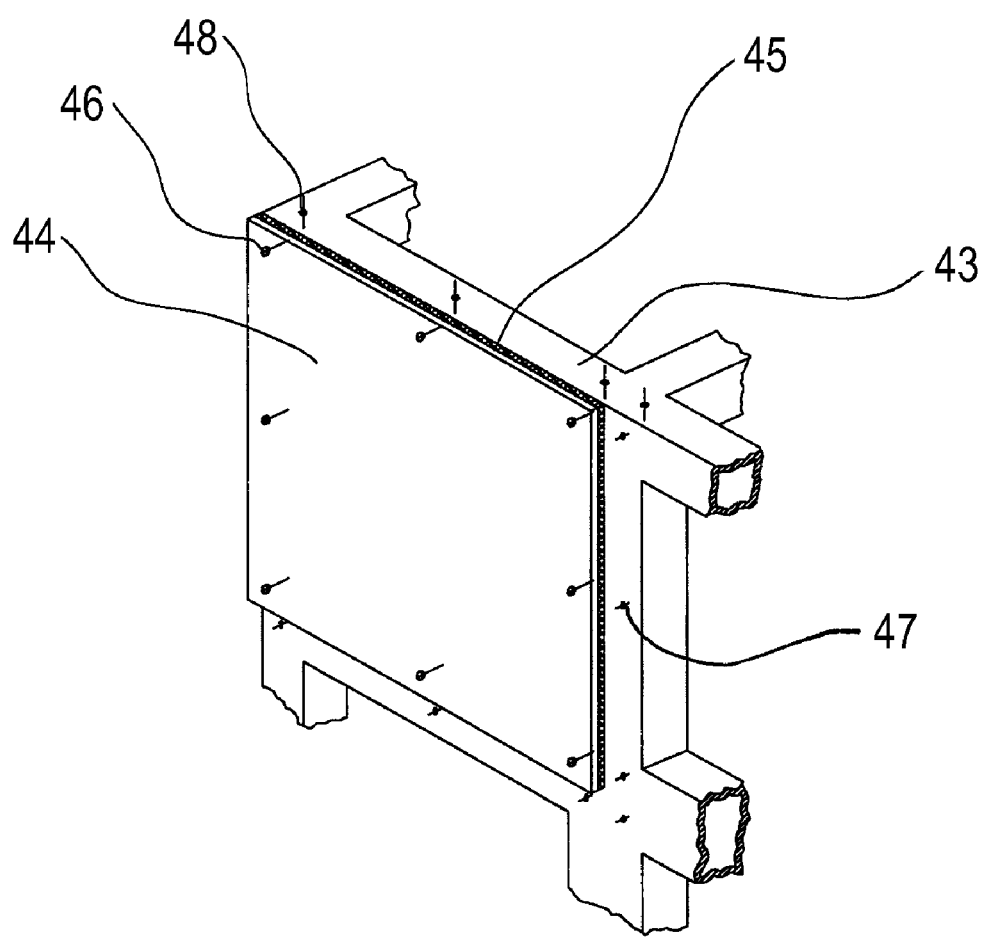

Details and further advantages of the invention will become clear from the following description of an example of a preferred embodiment. The figures, which merely give a schematic representation of an example of an embodiment, give individual details of:

FIG. 1 a cross-section of a device for testing a tire which includes pressure chamber;

FIG. 2 a perspective view of a positioning means on which a measuring head is mounted;

FIG. 3 a perspective view of the pressure chamber provided with a frame and a number of panels, and FIG. 4 a perspective view of a panel fastened onto the frame.

DETAILED DESCRIPTION OF THE INVENTION

The device displayed in FIG. 1 is used to test a test object by means of an interferometric measuring method. The test object in the present case is a tire 10, which could be an OTR tire. The device has at least one measuring head 20 by means of which the tire 10 can be scanned to produce a measurement result. The measuring head 20 can be configured, as is known from EP 1 014 036 B1, in order to test the tire 10 using an interferometric, in particular a shearographic, measuring method. Accordingly, the measuring head 20 is provided with an illuminating unit for illuminating the tire 10 and which is made up, for example, of a number of laser diodes 21. The measuring head 20 also has a shearing element by means of which the light beams reflected back from the tire 10 are used for interference. The shearing element is made up, for example, of a beam splitter, a movable mirror and a stationary mirror. Furthermore, the measuring head 20 is also provided with a camera 22 which is fitted with an electronic image sensor, for example a CCD- or CMOS-sensor. The image sensor is positioned within the optical path of the shearing element and serves to record the interfering light beams.

As can be seen in particular in FIG. 2, the device also has a positioning means 30 which enables the measuring head 20 to be moved between a park position I and a measuring position II. The positioning means 30 is provided with a first adjustment assembly 31 which enables the measuring head 20 to be moved in an axial direction z. In addition, the positioning means 30 is provided with a second adjustment assembly 32 which enables the measuring head 20 to be moved in a radial direction r, which extends orthogonal to the axial direction z. The adjustment assemblies 31, 32 are for example configured as linear guides or linear motors and thus enable a linear movement of the measuring head 20 in the axial direction z and the radial direction r. The adjustment assembly 31 is coupled to the adjustment assembly 32 so that the adjustment assembly 31 can be moved in a radial direction r by the adjustment assembly 32. As can be seen in FIG. 1, the adjustment assembly 32 is supported on a stationary portal 33 which for practical purposes can be dismantled non-destructively. The measuring head 20 is connected to the adjustment assembly 31 and, as required, can be rotated by means of a further adjustment assembly around a rotational axis extending for example in a horizontal direction to position the measuring head 20 in the desired measuring position II. The positioning means 30 has a protection screen 34 on it which protects the measuring head 20 when it is in park position I.

The device also has a pressure chamber in which tires 10 can be subjected to a prescribed pressure. The pressure prevailing in the pressure chamber can be an over-pressure or an under-pressure. A safety valve 100 prevents the pressure in the pressure chamber becoming disproportionately high or low and thus causing a deformation of, or damage to, the pressure chamber. In conjunction with a shearographic measuring method it has proved expedient to take atmospheric pressure as the reference status and to select as the measuring pressure a lower pressure to which the pressure chamber can be evacuated. In order to achieve a quick change of the pressure in the pressure chamber, at least one padding element 80 is positioned in the pressure chamber which reduces the volume of the pressure chamber. The pressure chamber has a hood 40 which has an open side facing a base 70. The base 70 may consist, for example, of the floor of the building in which the device is located.

As can also be seen in FIG. 1, there is a camera 90 provided in the pressure chamber which is connected to a monitor 91 located outside the pressure chamber. The camera 90 is positioned in the pressure chamber so that the interior of the pressure chamber is recorded. The light necessary to achieve reliable images of the interior of the pressure chamber is provided by a light source 93. The camera 90 enables the interior of the pressure chamber to be monitored while the tire 10 is being tested. Furthermore, the camera 90 can form part of a navigation system which facilitates the charging and discharging of the pressure chamber, for example by means of a fork-lift truck, by showing the image of the interior of the pressure chamber on the monitor 91 or on one of the monitors provided in the fork-lift truck. The appropriate practical equipment of the device is enhanced by a warning light 92 arranged outside the pressure chamber. The warning light 92 signals when a test procedure is being performed or, possibly for example together with acoustic means, when there is an operational irregularity such as the triggering of the safety valve 100.

The device also comprises a sub-frame 60 on which the tire 10 is positioned during the test and which also supports the portal 33, on which the positioning means 30 is secured. As can be seen in FIG. 1, the tire 10 can be positioned in a lying position or, as is known for example from DE 203 14 939 U1, in an upright position. If the tire 10 is in the lying position, the axial direction z extends vertically and the radial direction r extends horizontally. The sub-frame 60 is provided with a rotational installation 62 which enables the tire 10 to be rotated around a rotational axis R. If the tire 10 is supported in the lying position by the sub-frame 60, the rotational axis R extends in the axial direction z.

The hood 40 is supported by means of a number of bearing elements 41 on the base 70. The bearing elements 41 consist of vibration insulators which minimize the transfer of vibrations arising, in particular airborne and structure-borne vibrations, from the base 70 to the hood 40. However, the bearing elements 41 can also be sealing elements which provide a pressure-tight seal between the hood 40 and the base 70. It has proved to be particularly advantageous if the bearing elements 41 include both vibration insulators and sealing elements. In such a configuration for example, the hood 40 with its square cross-section can be supported in each of the corner areas by a vibration insulator and the spaces between the vibration insulators can be sealed by sealing elements.

The sub-frame 60 is supported by a number of bearing elements 61 on the base 70. The bearing elements 61 in this case are, for reasons of practical expediency, vibration insulators which minimize the transfer of vibrations from the base 70 to the sub-frame 60.

As can be seen particularly in FIG. 3, the hood 40 is provided with an extension 42 which extends in a radial direction r in the area of the top surface of the hood 40. The extension 42 serves to accommodate at least some of the adjustment assembly 31 when the measuring head 20 is in park position I. Since the extension 42 extends in the radial direction r, it is possible to move the adjustment assembly 31 together with the adjustment assembly 32 in a radial direction r.

The hood 40 has a frame 43 which can be dismantled into a number of parts, as can be seen in FIG. 4. It is expedient, to enable the frame 43 to be assembled and dismantled easily and non-destructively, for the parts of the frame to be attached to one another by means of screws or bolts entered into holes 48 in the frame 43.

The frame 43 is clad with a number of panels 44. The panels 44 are fastened to the frame 43 in a detachable manner by means of screws 46 entered into holes 47 in the frame 43 to enable the hood 40 to be assembled and dismantled easily and non-destructively. Furthermore, the panels 44 are fastened in a pressure-tight manner by means of a seal 45, as can be seen in FIG. 4.

The hood 40 is provided with a door 49 which, as shown in FIG. 3 as an example, can be a single swing door movable about a vertical axis. In the closed position, the door 49 rests against a frame part 51 formed by the hood 40 and is made pressure-tight by means of a seal 50. In order to ensure a reliable seal, the hood 40 is also provided with a door sill 52 against which the seal 50 lies when the door 49 is in the closed position.

To perform a shearographic measuring method, the tire 10 is illuminated by laser diodes 21 emitting coherent light. Generally, in order to test the inner peripheral surface of the tire 10 both the belt of the tire 10 and the shoulder of the tire 10 where the running surface comes together with the sidewall need to be illuminated. The sidewalls of the tire 10 are indeed generally tested from the outside, but if the tire width is appropriately large or if there is a sufficiently large distance between the beads of the tire 10 they can also be tested from the inside. The light beams reflected back from the surface of the tire 10 are recorded by means of a lens and projected to the shearing element of the measuring head 20 and with the help of this element interference is formed. The interfering light beams are recorded by the image sensor of the camera 22 positioned in the optical path of the shearing element to generate an interferogram. The measuring head 20 is connected to a control and evaluation installation, not shown in the figure, which processes the interferogram generated to produce a shearogram showing a deformation at the surface of the tire arising, for example, from the different states of the tire 10 which occur as a result of a change of pressure in the pressure chamber. The control and evaluation installation also serves in particular to control the positioning means 30, the rotation device 62, the measuring head 20, the camera 90, the warning light 92, the light 93 and the pressure prevailing in the pressure chamber.

The device described is characterized by the fact that relatively large components, such as for example OTR tires with a diameter of sometimes more than 5 meters, can be tested. This is accomplished primarily as a result of the fact that the hood 40 and the sub-frame 60 are supported independently of each other on the base 70 by means of bearing elements 41, 61. The disconnected mounting of the hood 40 and the sub-frame 60 makes it possible to adjust the bearing elements 41, 61 easily to the weight of each, the hood 40 and the sub-frame 60, which has to be supported. Further features which facilitate the testing of relative large test objects by means of a shearographic measuring method are the extension 42 and the padding 80 which reduce the volume of the pressure chamber as far as possible so that the pressure in the pressure chamber can be changed quickly and thereby ensure that short testing cycles are possible. The simple assembly and the non-destructive dismantling of the hood 40 ensure not least that the device can still be easily transported even when the pressure-chamber is relatively large owing to the dimensions of the test object.

| LIST OF REFERENCES | |
|---|---|
| 10 | tire |
| 20 | measuring head |
| 21 | laser diode |
| 22 | camera |
| 30 | positioning means |
| 31 | first adjustment assembly |
| 32 | second adjustment assembly |
| 33 | portal |
| 34 | protective screen |
| 40 | hood |
| 41 | second bearing element |
| 42 | extension |
| 43 | frame |
| 44 | panel |
| 45 | seal |
| 46 | screw |
| 47 | hole |
| 48 | hole |
| 49 | door |
| 50 | seal |
| 51 | bead |
| 52 | door sill |
| 60 | sub-frame |
| 61 | first bearing element |
| 62 | rotation installation |
| 70 | base |
| 80 | padding |
| 90 | camera |
| 91 | monitor |
| 92 | warning light |
| 93 | light |
| 100 | safety valve |
| R | axis of rotation |
| r | radial direction |
| z | axial direction |
| I | park position |
| II | measuring position |

The invention claimed is:

1. Device for non-destructive testing of a test object comprising:
   at least one measuring head, for scanning the test object to produce a measurement value;
   positioning means for moving the measuring head between a park position and a measuring position;
   a pressure chamber subjecting the test object to a prescribed pressure and including a hood;

a sub-frame, for receiving the test object;
a first bearing element supporting the sub-frame and reducing the transmittal of vibrations from a base to the sub-frame; and
a second bearing element supporting the hood separately from the sub-frame and reducing the transmittal of vibrations from the base to the hood.

2. Device according to claim 1 in which at least one of the first bearing element and the second bearing element is a vibration insulator.

3. Device according to claim 1 in which the second bearing element is a sealing element.

4. Device according to claim 1 in which the hood is configured to be dismantled non-destructively.

5. Device according to claim 4 in which at least one of the sub-frame and the positioning means is configured to be dismantled non-destructively.

6. Device according to claim 4 in which the positioning means is supported on the sub-frame.

7. Device according to claim 4 in which the hood comprises an extension which accommodates at least a part of the positioning means in the park position.

8. Device according to claim 4 in which the hood comprises a frame which is clad in a number of panels.

9. Device according to claim 4 in which the hood comprises a door.

10. Device according to claim 4 comprising-at least one padding element in the pressure chamber.

11. Device according to claim 4 comprising a camera in the pressure chamber.

12. Device according to claim 4 comprising an artificial light source in the pressure chamber.

13. Device according to claim 4 in which the pressure chamber comprises a safety valve.

14. Device according to claim 4 in which the positioning means moves the measuring head in an axial direction and/or in a radial direction.

15. Device according to claim 4 in which the measuring head is rotatable around a rotation axis extending in the axial direction relative to the test object.

16. Device according to claim 4 in which the measuring head comprises:
an illumination unit for illuminating the test object;
a shearing element by which the light beams reflected back from the test object are caused to produce interference; and
an electronic image sensor located in the optical path of the shearing element and which records the interfering light beams.

17. Device according to claim 4 comprising a protective screen for protecting the illuminating unit in the park position.

18. Device according to claim 4 comprising-control and evaluation means for controlling at least one of the positioning means, and the rotation means and the measuring head and the pressure prevailing in the pressure chamber and for evaluating the measurement results.

19. Device according to claim 1 in which at least one of the sub-frame and the positioning means is configured to be dismantled non-destructively.

20. Device according to claim 1 in which the positioning means is supported on the sub-frame.

21. Device according to claim 1 in which the hood comprises an extension which accommodates at least a part of the positioning means in the park position.

22. Device according to claim 1 in which the hood comprises a frame which is clad in a number of panels.

23. Device according to claim 22 in which the panels are sealed pressure-tight by a seal.

24. Device according to claim 22 in which the panels are detachably attached to the frame by fastening elements.

25. Device according to claim 22 in which the frame is configured to be dismantled non-destructively into a number of frame parts.

26. Device according to claim 1 in which the hood comprises a door.

27. Device according to claim 26 in which the door comprises a swing door.

28. Device according to claim 27 in which the door is mounted on a vertical axis and comprises a supporting wheel.

29. Device according to claim 27 in which the door is mounted on a horizontal axis and is connected to a counter-weight.

30. Device according to claim 26 comprising a pressure-tight seal sealing the door.

31. Device according to claim 1 comprising at least one padding element in the pressure chamber.

32. Device according to claim 1 comprising a one camera in the pressure chamber.

33. Device according to claim 32 comprising a monitor linked to the camera and positioned outside the pressure chamber.

34. Device according to claim 1 comprising an artificial light source in the pressure chamber.

35. Device according to claim 1 in which the pressure chamber comprises a safety valve.

36. Device according to claim 1 in which the positioning means moves the measuring head in an axial direction and/or in a radial direction.

37. Device according to claim 36 in which the axial direction runs vertically and the radial direction run horizontally.

38. Device according to claim 37 or 36 in which the positioning means comprises a first adjustment assembly for moving the measuring head in an axial direction, and a second adjustment assembly coupled to the first adjustment assembly for moving the first measuring head in a radial direction.

39. Device according to claim 1 in which the measuring head is rotatable around a rotation axis extending in the axial direction relative to the test object.

40. Device according to claim 39 in which the sub-frame comprises a rotation means for rotating the test object around the rotation axis.

41. Device according to claim 1 in which the measuring head comprises:
an illumination unit for illuminating the test object;
a shearing element by which the light beams reflected back from the test object are caused to produce interference; and
an electronic image sensor located in the optical path of the shearing element and which records the interfering light beams.

42. Device according to claim 1 comprising a protective screen for protecting the illuminating unit in the park position.

43. Device according to claim 1 comprising control and evaluation means for controlling at least one of the positioning means and the rotation means and the measuring head and the pressure prevailing in the pressure chamber and for evaluating the measurement results.

* * * * *